(No Model.) 3 Sheets—Sheet 1.
O. T. X. ADAMS.
SMELTING FURNACE, SLAG STEAM GENERATING FURNACE AND PLANT.
No. 395,643. Patented Jan. 1, 1889.
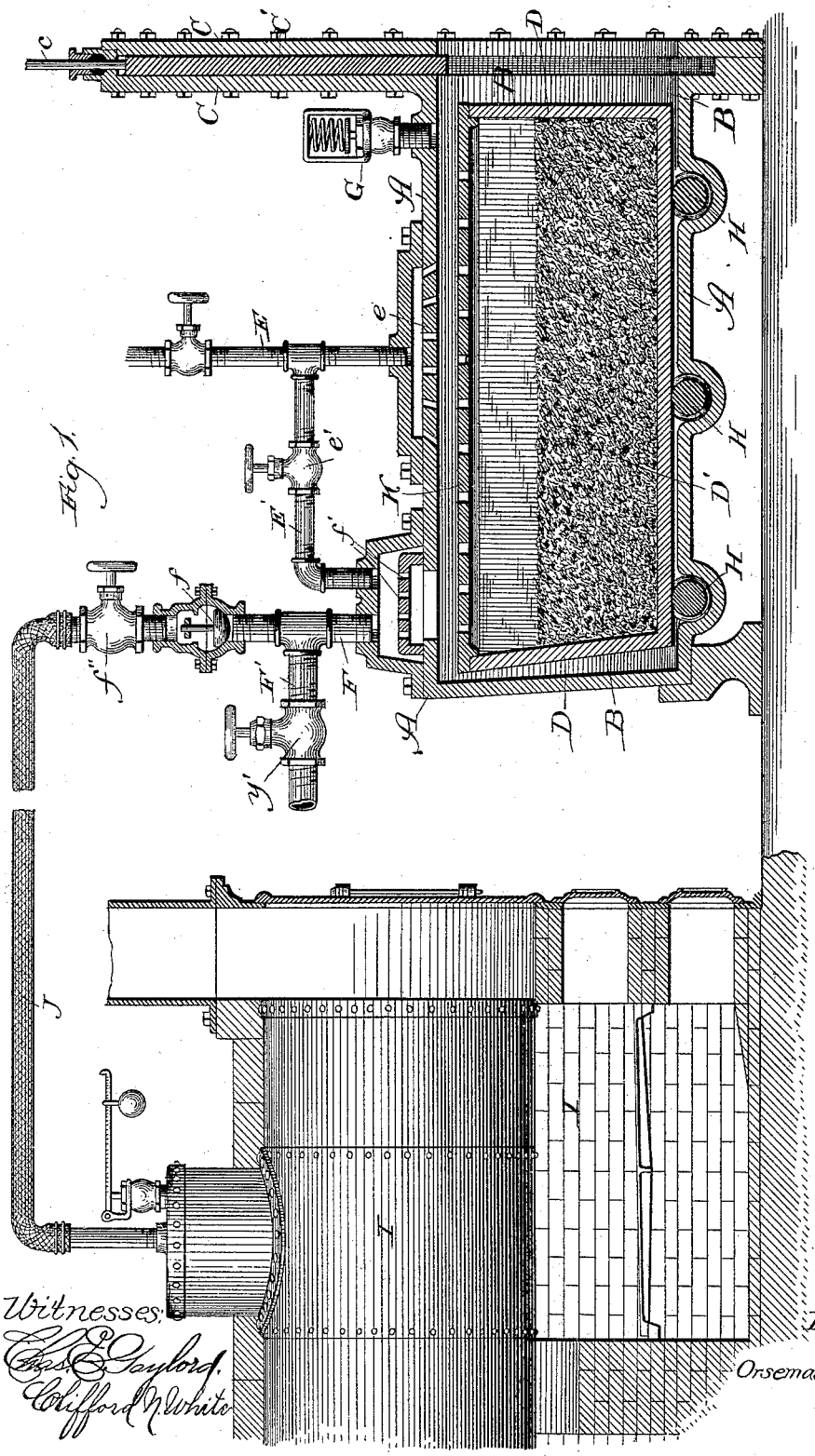

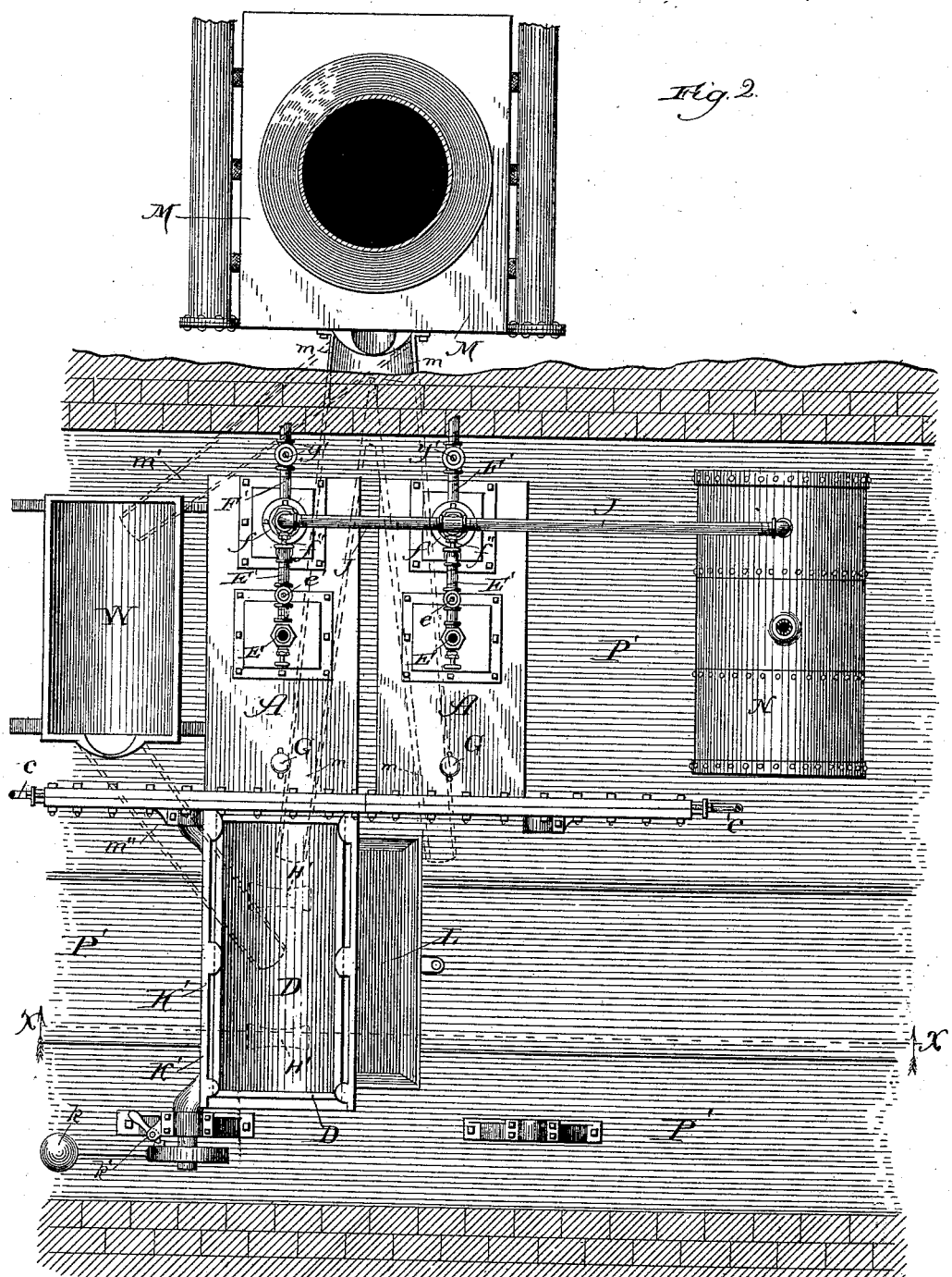

(No Model.) 3 Sheets—Sheet 3.
O. T. X. ADAMS.
SMELTING FURNACE, SLAG STEAM GENERATING FURNACE AND PLANT.
No. 395,643. Patented Jan. 1, 1889.
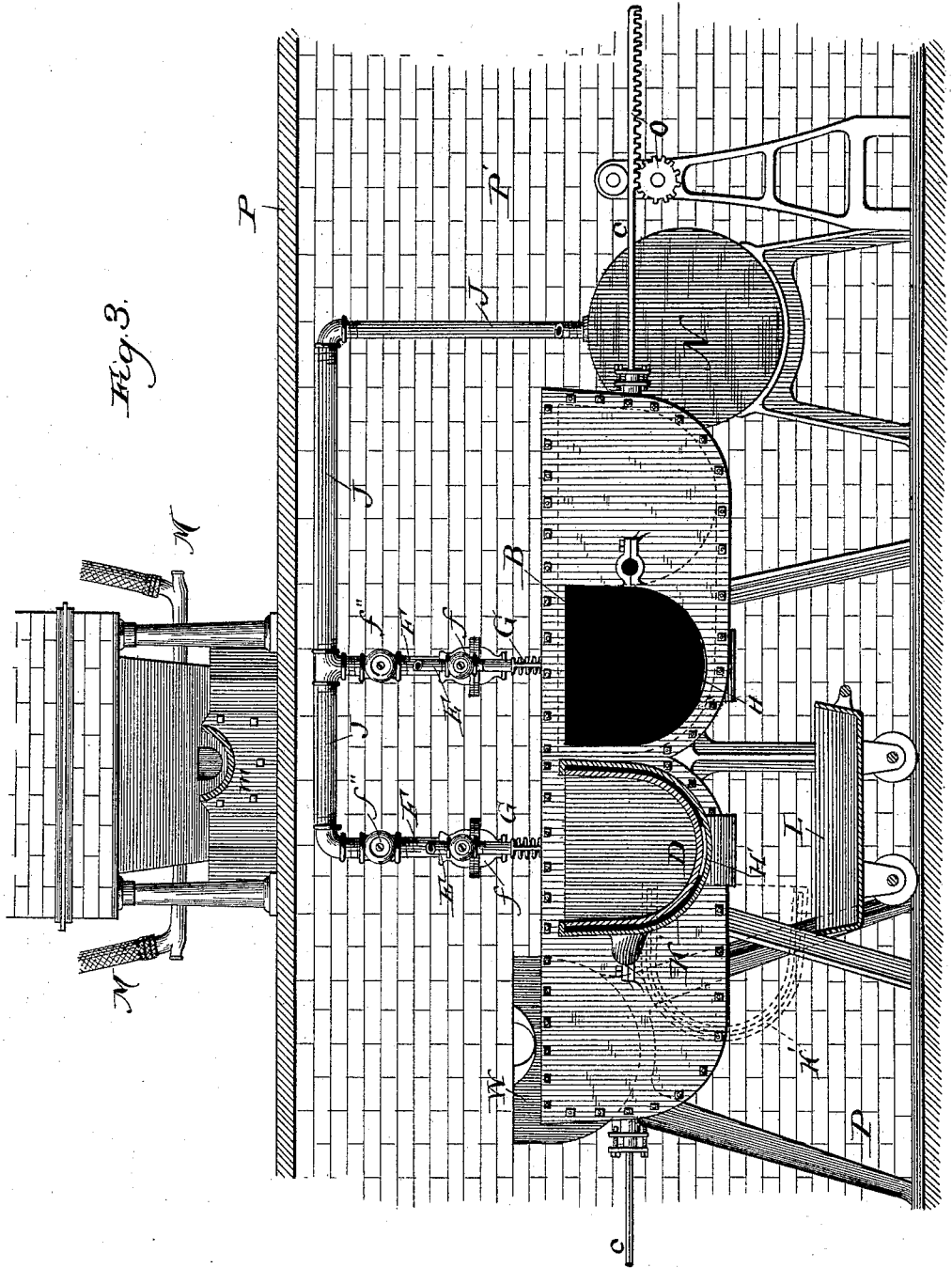
Witnesses:
Chas. E. Gaylord.
Clifford W. White.
Inventor:
Orsemas T. X. Adams,
By
Attys.

UNITED STATES PATENT OFFICE.

ORSEMAS T. X. ADAMS, OF CHICAGO, ILLINOIS, ASSIGNOR TO THE AMERICAN SLAG FURNACE COMPANY.

SMELTING-FURNACE SLAG STEAM-GENERATING FURNACE AND PLANT.

SPECIFICATION forming part of Letters Patent No. 395,643, dated January 1, 1889.

Application filed April 2, 1888. Serial No. 269,229. (No model.)

*To all whom it may concern:*

Be it known that I, ORSEMAS T. X. ADAMS, a citizen of the United States, residing at Chicago, in the county of Cook and State of Illinois, have invented certain new and useful Improvements in Smelting Furnaces Slag Steam-Generating Furnaces and Plants; and I do hereby declare the following to be a full, clear, and exact description of the invention, such as will enable others skilled in the art to which it appertains to make and use the same.

The objects of my invention are to design and construct a slag steam-generating furnace and plant wherein heated or molten slags or other hot material may be employed in the generating of steam by bringing water into direct contact with it, and for utilizing the steam so generated in such manner as to afford a continuous and nearly-uniform supply for motive power, and to devise, arrange, and construct my slag steam-generating furnace and plant in such a manner as to receive the heated slags from the furnace of its production, employ it in the generating of steam, and discharge it to the place of final deposit with but little manual labor.

My invention consists in the combination of parts and features and details of construction hereinafter described and claimed.

In the description of my invention I shall term and refer to the slag furnace-chamber, which is also the steam-generating chamber, as the "generating-chamber;" but it will be understood that this chamber is properly a furnace-chamber in addition to a steam-generating chamber, as it is to contain a very highly-heated slag, which is the steam-generating agent, and I shall term my slag steam-generating furnace and plant a "slag steam-generator."

In the drawings, Figure 1 is a longitudinal vertical section of my slag steam-generating furnace and plant, showing the generating-chamber and a door for closing the same, consisting of a sliding valve-plate adapted to be operated vertically, and showing its various steam and water pipes and valves and the vessels containing slag located in the generating-chamber; also showing a side elevation, with part in vertical section, of a part of an ordinary steam-generating boiler and fuel-combustion furnace, and also showing the construction, connection, and relations of the two and their various parts. Fig. 2 is a top plan view of a smelting-furnace and my slag steam-generating furnace and plant located in a trench in the ground, with the covering and one of the slag-vessels, supporting and dumping frames or devices removed, with the slag spouts or conduits indicated by dotted lines, and the sliding valve-plate adapted to be operated horizontally. Fig. 3 is a transverse vertical section of Fig. 2 on the line X X, looking in the direction of the arrows, thus showing most of the parts in front elevation, and also showing a cover or bridge across or over the trench and means for operating the sliding valve-plate.

Similar letters relate to similar parts throughout the several figures of the drawings.

A is a casing or shell forming a steam-generating chamber, B; C, a valve having a sliding plate, C', by which the passage to chamber B is closed and opened; c, a rod to operate such sliding plate; D, a vessel containing slags located within the chamber B; D', such slag; E, main water-supply pipe; E', auxiliary water-supply pipe; e', valve in same; e, a perforated water-supply surface; F, main steam-exhaust pipe; F', auxiliary steam-exhaust pipe; f, steam check-valve; f', a screen or perforated surface through which the steam passes; G, a safety-valve; H, rollers located in the bottom of the chamber B to support and carry the vessel D; H', rollers located outside of the generating-chamber to support and carry the said vessel to the rollers H; I, an ordinary steam-boiler, and I' such boiler's ordinary combustion-furnace; J, a steam pipe or passage communicating from the slag steam-generating chamber to and in the boiler I or other receiving drum or chamber N; K, a perforated cover over the slag-containing vessel; K', a hinge-supporting frame or device for the slag-vessel; k, a weight to help balance the said supporting device; k', a catch or lock to hold the supporting device in place; L, a car for receiving cooled slags; M, a smelting-furnace; m, spouts to convey slag from the smelting-furnace; N, a steam-storage drum or chamber; O, a rack and pinion, by which, through the rod c, the valve-plate is operated; P, in Fig. 3, a bridge or covering across the trench or conduit P' and over the generator; P', such trench or conduit; W, a receiver, into which the slag first flows; m', trough from the smelting-furnace to the slag-receiver; m'', a trough from such receiver to the vessel D. Both troughs are shown by dotted lines in Fig. 2.

In making my slag steam-generating furnace and plant I provide a chamber, B, into which the hot or molten slags are placed and the steam generated. This chamber may be of any desirable shape, although preferably of the shape shown in the drawings, and of sufficient size to admit the quantity of slags to be treated at one time in the manner desired, and provide it with an opening or passage, preferably at one end and of the required size to permit the slag, and a vessel which may contain it, if desired, to be passed through into the chamber. I provide it with a valve, C, preferably having a sliding plate, C', by which the passage to the chamber B may be closed and rendered steam-tight, and reopened at the proper time by the operator, and I arrange two or more rollers, H, in the bottom of said chamber, and provide it with one or more suitable main water-supply pipes or passages, E, and preferably one or more auxiliary water-supply pipes or passages, E', the first of which I preferably connect, as shown, in such manner as to allow the water to pass through the perforated surface e, which serves to spray it in the chamber, or divide it into several small streams as it enters, and I preferably introduce the water, as shown, in the upper or top part of the said chamber, so that it will, while being introduced through such perforations, fall upon the slag that may be contained therein. I also provide the said chamber B with one or more suitable main exhaust pipes or passages, F, to carry off the steam as it is generated by the water coming in contact with the hot slags. I preferably locate a perforated surface or screen, f', at or over the entrance of the steam-exhaust pipe or passage to the chamber B, which serves to arrest any pieces of slag that may fly from the mass of slag while cooling, or have a tendency to be carried by the steam into such exhaust-passage. I prefer to connect the auxiliary water-supply pipe or passage E' to the chamber, as shown in Fig. 1, entering it near the entrance of the main steam-exhaust pipe or passage, through which, by opening the valve e', water may be introduced at this point to decrease the temperature of the steam as it leaves the chamber B and enters the pipe or passage F.

I also provide a slag vessel or receptacle, D, of such size as to be passed through the opening afforded by the valve C into the chamber B, and preferably of a sufficient size to fill or occupy as nearly as possible the entire space in the said chamber, and I prefer to use a perforated cover, K, over it, as shown in Fig. 1, to prevent the slag from flying while being cooled, and also preferably provide a hinged or dumping supporting frame or device, K', as shown in Figs. 2 and 3, carrying rollers H', and adapted to receive, carry, support, and hold the slag-vessel D in place while it is being dumped, and I locate it in front of the passage to the chamber B in such manner as to receive the said vessel from the said chamber and hold it while empty in such a position as to be passed in and out of the chamber through the valve when open.

I also provide the steam-exhaust pipe or passage with a check-valve, f, of any suitable design, and locate it in the said pipe or passage in such a manner as to be opened by a steam-pressure within the generating-chamber and to close when the pressure within such chamber sufficiently decreases. It will be appreciated that this check-valve will allow the steam generated in the generating-chamber to pass out of such chamber; but when the slag in the chamber is sufficiently cooled this check-valve will close and prevent the steam from returning when the generating-chamber is used in conjunction with a steam-receiver; or, when several generating-chambers are operated in conjunction, any one of the chambers may be opened and the check-valve will prevent the steam from passing back into the generating-chamber and escaping. I also preferably provide this pipe with another valve, f''', of any desirable pattern, which may be used to close the exhaust pipe or passage, if desired, and I also preferably extend this steam pipe or passage, as shown in Fig. 1 and indicated by the letter J, to an ordinary boiler, I, which serves as a steam-receiving chamber, or to other suitable receiving drum or chamber, N, as shown in Figs. 2 and 3. The object of using an ordinary boiler that is provided in the ordinary way with a fuel-combustion furnace is that in cases where an insufficient amount of slag is obtained to generate the desired amount of steam, or where heated slags are only obtainable at intervals, this boiler of the ordinary design may be heated and steam generated in the usual way to make up and supply such deficiencies in steam as there would be by the use of the slag steam-generator alone, although where a sufficient supply of heated slags is obtainable it is preferable to employ a steam-receiving drum or chamber, as shown in Figs. 2 and 3; or, if desired, this receiving drum or chamber and the boiler may be dispensed with and the steam used directly from the generating-chamber or a common steam-pipe, which may serve as a receiving drum or chamber and be connected with two or more generating-chambers.

I also provide the generating-chamber B with a safety-valve, G, to relieve any excess of internal pressure, and with one or more auxiliary steam-exhaust pipes or passages, F', provided with a valve, y'. This may be a branch of the main steam pipe or passage F, located between the check-valve $f$ and the generating-chamber. The object of this pipe or passage is to allow the steam to escape from the chamber B after the slags have become cooled to such an extent as to no longer generate the water into steam or to generate steam under a sufficiently high pressure for use, and after the check-valve $f$ has become closed this steam may be let off by this pipe or passage F' to a feed-water-heating tank, or to any other place desired.

In Figs. 2 and 3 I have shown my slag steam-generating furnace located in a trench or conduit, P', close to a smelting-furnace, and arranged in such a manner as to allow the molten slags to flow from the smelting-furnace by means of the trough or conduit $m'$ into a slag-receiver, W, into which the heavy metal that may be contained in the slag may settle and be retained, while the slag may flow by means of the trough or conduit $m''$ into the slag-vessel D while it is located in the hinged frame or supporting device K'; or, if desired, the receiver W and trough or conduits $m'$ $m''$ may be dispensed with and the slag flow directly by means of the trough or conduit $m$ into the vessel D. I have shown a car located under such supporting device adapted to receive the cooled slags as they are dumped from the vessel D by means of the hinged supporting device. In Fig. 2 I have shown the covering or bridge P to the trench or conduit in which my furnace and plant is located as being removed, and in Fig. 3 I have shown the said covering P in sections, while in both of the said figures I have shown but one of the supporting devices K', slag-vessels D, and slag-receiver W.

In operating my slag steam-generating furnace and plant when it is located and arranged as shown and described in Figs. 2 and 3, I place the vessel D to contain the slags into the supporting device K', and allow a desired quantity of heated or molten slags to flow into it by means of the trough or conduit $m'$, receiver W, and trough or conduit $m''$; or when such receiver and trough or conduits are not used directly from the smelting-furnace by means of the trough or conduit $m$, I then draw the plate C' back, thus opening the passage to the chamber B, then push or move the vessel D forward, which is supported and carried by the rollers H' and H, into the generating-chamber B. I then close the passage to the chamber B by means of the valve-plate C', which is operated by means of the rod $c$, rack and pinion O, or other convenient way. In this way the generating-chamber is made steam-tight. I then introduce water by means of the water-supply pipes or passages E, which may be connected to a pump or other source of supply, and through the perforated surface $e$ upon and through the perforated plate K when one is used, and in contact with the heated or molten slags D', the heat of which instantly generates the water so introduced into steam, creating a pressure within the chamber, which opens the check-valve located in the steam-exhaust pipe or passage, thus affording an escape for the steam as it is generated. This pipe or passage, as shown and above described, is preferably connected to a steam-boiler or other receiving-chamber from which the steam may be taken to an engine or other place of use, although, as I have above stated, the steam may be used directly from the generating-chamber or from a common pipe or passage connecting with one or more of the said chambers. When the slag within the generating-chamber has become cool to such a degree as to no longer generate the water brought into contact with it into steam, the pressure within the said generating-chamber B will be diminished to a sufficient degree to allow the check-valve $f$ to close, and thus close the passage between the steam-receiving boiler or drum-chamber and the generating-chamber, when the valve $y'$, located in the auxiliary exhaust passage or pipe F', may be opened, and the remaining steam, and hence the entire pressure within the generating-chamber, will be exhausted. Then the valve-plate C' may be drawn back, opening the passage to the generating-chamber B, through which the vessel D, containing the then cooled slag, may be drawn or pulled in any convenient way into the hinged supporting device K', and by means of the catch or lock $k'$ the hinged or dumping supporting device K' may be released and allowed to swing downward, carried by the weight of the cooled slag, as indicated by the dotted lines in Fig. 3, and the slag dumped into the car L by its own gravitation, when the weight $k$ will bring the hinged or dumping supporting device K', carrying the slag-vessel, to its place again. Then it may be refilled with heated or molten slags and the operation repeated. The operation of this device, as arranged in Figs. 2 and 3, will be readily understood by reference to the drawings; hence I do not think it necessary to further describe them.

In Fig. 1, where the generating-chamber, connections, and parts are represented as being operated on the surface of the ground and without the supporting device K', the slag-vessel may be handled by means of a suitable truck or crane, or in any other convenient manner; but the operation and treatment of the slags, after being placed in the generating-chamber, are the same as that described in Figs. 2 and 3. To afford a continuous supply and nearly-uniform pressure of steam for use, I preferably employ two or more of the steam-generating chambers and use them in the manner above described, connecting them with one common steam-pipe, as the conditions under which they are to be used require, and operate them with relation to each other, so as to have one or more of the said chambers filled or containing heated slags at all times, thus affording a continuous steam-supply to the common receiving-chamber, and, as above stated, when the supply of slags is insufficient or is at intervals, as is the case of iron-smelting furnaces, the generating-chamber may be connected to and operated in conjunction with a steam-boiler of the ordinary type, which may be used in the usual manner to supply any deficiency of steam.

I also locate the generating-chambers with reference to each other and the place for their operation in the most convenient manner, either placing the valve-plates C' to be operated vertically or horizontally. I preferably arrange two or more, as shown in Figs. 2 and 3, in a trench or conduit under the surface of the ground and close to a smelting-furnace, so as to allow the slags to flow directly from a smelting-furnace through a receiver into the slag-vessel, or directly from the smelting-furnace to such vessel, and arrange a track and a car underneath the supporting device in such a manner as to receive the cooled slags and convey them to a place of final deposit. I also prefer to cover the trench with a bridge or roofing, P, leaving such covering level with the surface of the ground, and provide holes through it for the passage of the slag to the generator, and in this manner my slag steam-generating furnace is entirely out of the way and does not afford an obstruction to the surface workings around the base of the smelting-furnace.

What I consider as new, and desire to secure by Letters Patent, is—

1. The combination, with a slag steam-generator having one or more steam-generating chambers wherein steam is generated by the heat from hot or molten slags, of a steam-generating boiler provided with a fuel-combustion chamber whereby steam is generated by the heat of fuel-combustion and one or more passages whereby the steam may flow from the slag steam-generating chamber to and in the fuel-combustion steam-generating boiler, the said passages having means for stopping or checking the flow of steam through them when desired, substantially as described.

2. In a slag steam-generator, the combination of one or more steam-generating chambers having a passage thereto for the introduction of hot or molten material, means for closing and opening the said passage, water-supply and steam-exhaust passages communicating with the said chamber, and an automatic check-valve located in the steam-exhaust passage, through which the steam generated may pass from the generating-chamber, and which will be permitted to close or be closed by a cessation of the flow of steam from the generating-chamber or by a sufficient back steam-pressure, whereby steam is permitted to pass from the generating-chamber, but is prevented from returning, entering it through this passage, substantially as described.

3. The combination, with a slag steam-generator having one or more steam-generating chambers, a passage for the introduction of hot slags thereto, means for closing and opening such passage, water-supply and steam-exhaust passages thereto, and an automatic check-valve located in such steam-exhaust passage, of a steam-receiving chamber into which the steam generated in one or more of the said generating-chambers may pass, and means whereby the steam may pass into the said receiving-chamber, substantially as described.

4. In a slag steam-generator, the combination of a steam-generating chamber having a passage for the introduction of hot slags thereto, means for closing and opening such passage, water-supply and steam-exhaust passages, an automatic check-valve located in the said steam-passage, and a safety-valve communicating with the said generating-chamber, substantially as described.

5. In the combination of a slag steam-generator, a steam-generating chamber provided with one or more suitable water-supply and steam-exhaust pipes or passages and having a passage for the introduction of hot or molten material thereto, and a valve having a sliding valve-plate, whereby the said passage may be closed and opened, and means for operating the said plate, substantially as described.

6. In a slag steam-generator, the combination of a steam-generating chamber having a passage for the introduction of hot slag thereto, means for closing and opening the same, one or more steam-exhaust passages, one or more main water-supply passages, and one or more auxiliary water-supply passages, substantially as described, and for the purposes set forth.

7. In a slag steam-generator, the combination of a steam-generating chamber having a passage for the introduction of hot slags thereto, means for closing and opening the same, one or more water-supply passages thereto, one or more main steam-exhaust passages therefrom, and one or more auxiliary steam-exhaust passages therefrom having means for closing and opening the same, substantially as described, and for the purposes set forth.

8. In a slag steam-generator, the combination of a steam-generating chamber having a passage thereto for the introduction of hot slag, one or more water-supply and steam-exhaust passages thereto, and a perforated plate placed over the entrance of one or more of the said water and steam passages, substantially as described, and for the purposes set forth.

9. In a slag steam-generator, the combination of steam-generating chamber having a passage thereto adapted to admit a slag-containing vessel, means for closing and opening said passage, water-supply and steam-exhaust passages, a slag-containing vessel located therein, and a perforated plate or cover over the said slag-containing vessel, substantially as described.

10. In the slag steam-generator, the combination of a steam-generating chamber having a passage for the introduction of a slag-containing vessel thereto, means for closing and opening the said passage, water-supply and steam-exhaust passages, and one or more supports fixed within the said chamber, adapted to revolve and carry a vessel containing slag that may be placed therein, substantially as described.

11. In a slag steam-generator, the combination of a steam-generating chamber having a passage thereto for the introduction of a slag-containing vessel, means for closing and opening said passage, water-supply and steam-exhaust passages, one or more supports adapted to revolve within the chamber, and a frame or supporting device outside of the said chamber, carrying supports for the slag-containing vessel that are adapted to revolve, and placed in such a manner in relation to the entrance to the said chamber as to assist in supporting and carrying this slag-containing vessel to, into, and out of the said chamber, substantially as described.

12. In a slag steam-generator, the combination of a steam-generating chamber having a passage thereto for the introduction of a vessel containing slags, means for closing and opening said passage, water-supply and steam-exhaust passages, a vessel containing slag adapted to be passed into said chamber, and a hinged or dumping supporting device located in such a manner as to receive the said vessel from through its passage to the chamber and support and hold it while being dumped, substantially as described.

In testimony whereof I affix my signature in presence of two witnesses.

ORSEMAS T. X. ADAMS.

Witnesses:
 M. R. FRESHWATERS,
 S. G. SWISHER.